United States Patent
Park et al.

(10) Patent No.: US 9,426,210 B2
(45) Date of Patent: Aug. 23, 2016

(54) MAPPING SERVER AND MAPPING METHOD

(71) Applicant: HugeFlow Co., Ltd., Seoul (KR)

(72) Inventors: Gun Tae Park, Seoul (KR); Gil Bok Lee, Seoul (KR)

(73) Assignee: HugeFlow Co., Ltd., Seoul (KR)

( * ) Notice: Subject to any disclaimer, the term of this patent is extended or adjusted under 35 U.S.C. 154(b) by 426 days.

(21) Appl. No.: 13/922,164

(22) Filed: Jun. 19, 2013

(65) Prior Publication Data

US 2013/0346471 A1 Dec. 26, 2013

(30) Foreign Application Priority Data

Jun. 20, 2012 (KR) ........................ 10-2012-0066431

(51) Int. Cl.
*G06F 15/16* (2006.01)
*H04L 29/08* (2006.01)
*H04W 76/02* (2009.01)

(52) U.S. Cl.
CPC ............... *H04L 67/10* (2013.01); *H04L 67/36* (2013.01); *H04W 76/026* (2013.01)

(58) Field of Classification Search
CPC . H04W 76/026; H04W 12/08; H04W 12/06; H04L 67/10; H04L 29/08
See application file for complete search history.

(56) References Cited

U.S. PATENT DOCUMENTS

| | | | |
|---|---|---|---|
| 8,997,195 B1* | 3/2015 | Fadida et al. ...................... 726/7 |
| 2005/0122454 A1* | 6/2005 | Sharp .................. G02B 27/288 | 349/119 |
| 2006/0158454 A1* | 7/2006 | Heynderickx ......... G09G 5/026 | 345/589 |
| 2010/0295805 A1* | 11/2010 | Shin .................... G06F 3/04883 | 345/173 |
| 2011/0026436 A1* | 2/2011 | Karaoguz ........... H04L 12/2803 | 370/254 |
| 2011/0210171 A1* | 9/2011 | Brown ............... G06Q 20/3276 | 235/382 |
| 2011/0238555 A1* | 9/2011 | Rosenthal .............. G06Q 40/04 | 705/37 |
| 2012/0198531 A1* | 8/2012 | Ort ........................ H04W 12/08 | 726/7 |
| 2013/0080616 A1* | 3/2013 | Tsui ...................... H02J 7/0055 | 709/223 |
| 2013/0091548 A1* | 4/2013 | Song ..................... H04W 12/04 | 726/4 |
| 2013/0212289 A1* | 8/2013 | Krishnakumar .... H04L 12/1822 | 709/228 |

* cited by examiner

*Primary Examiner* — Ario Etienne
*Assistant Examiner* — Kidest Mendaye

(57) ABSTRACT

The examples of the present invention relates to a mapping server and a mapping method for inter-working between a display controlling computer and portable terminal devices. According to an example of the present invention, a mapping server is configured to store information on terminal call signal displayed on a display area of a display unit controlled by a display controlling computer identified on a network, the information on terminal call signal including color information; receive response signal of a portable terminal device generated by the portable terminal device recognizing the terminal call signal displayed on the display area by the display controlling computer through a photosensor installed on the portable terminal device; and map between the terminal call signal and the response signal, thereby linking between the display controlling computer and the portable terminal device on the network.

19 Claims, 5 Drawing Sheets

MAPPING SERVER AND MAPPING METHOD

CROSS-REFERENCE TO RELATED APPLICATION

This application claims priority of Korean Patent Application No. 10-2012-0066431, filed on Jun. 20, 2012, in the KIPO (Korean Intellectual Property Office), the disclosure of which is incorporated herein entirely by reference.

BACKGROUND OF THE INVENTION

1. Field of the Invention

The present disclosure relates to a mobile computing technology, and more particularly, to a mapping server and a mapping method for inter-working between a display controlling computer and portable terminal devices.

2. Description of the Related Art

Currently, in the wireless communication market, an application market has been significantly activated in accordance with spread of wireless terminal devices such as a smart phone, or the like. A terminal device capable of wireless communication has been expanded to a mobile computing device such as a portable phone, a net-book, a tablet personal computer (PC), an e-book terminal device with the smart phone in the lead. Based on this trend, new services and application markets have been so created that a large number of services and applications have been provided.

Based on a network, a computer device has been evolved to various systems such as ubiquitous and clouding computers beyond conventional classification system of a desktop and a laptop computer. In addition, due to improvement of mobility and miniaturization and development of a networking technology in accordance with high density and capacity of a central processing unit and a storage device and, the computer device has been expanded to any application device in which the central processing unit and the memory unit may be mounted. Further, the development of a user friendly interworking technology for allowing heterogeneous devices, for example, a designated computing device such as a desktop PC and a portable terminal device such as a smart phone to perform work together and to exchange and share information with each other, and various services using the former has been demanded.

Generally, in data communication between the devices, one and more of which functions as access points of a network, wired or wireless connections between the devices is required in order for the devices to recognize each other and transmit data to each other. Conventionally, such connections require that a user conducts a manual operation at an operation system level or treats a hardware resource such as a physical port, which is mostly cumbersome. For example, in the case of the wired connection between the computer device and the portable terminal device, connection specifications and form factors are different across each of the manufacturers of the portable terminal device. Therefore, in order to physically connect between the computer device and the portable terminal device, ports or adaptors having various specifications should be prepared. There might be limitation to the number of devices connected to each other due to the number of physical ports. For example, in the case of the wireless connection between the devices, it is required to select and set a wireless network in each device by the user, or for the devices to be connected in a single local area network (LAN).

SUMMARY OF THE INVENTION

An object of the present disclosure is directed to providing a mapping server capable of providing various services and user friendly technologies regarding inter-connection and data communication between a computer device and a portable terminal device.

Another object of the present invention is to providing a mapping method having the above-mentioned advantages.

According to an exemplary embodiment of the present invention, there is provided a mapping server configured to: store information on terminal call signal displayed on a portion or the entirety of a display area of a display unit controlled by a display controlling computer identified on a network, the information on terminal call signal including color information; receive response signal of a portable terminal device generated by the portable terminal device recognizing the terminal call signal displayed on the display area by the display controlling computer through a photo-sensor installed on the portable terminal device; and map between the terminal call signal and the response signal, thereby linking between the display controlling computer and the portable terminal device on the network so that any one or both of exchange and sharing of data between the display controlling computer and the portable terminal device are performed.

The panorama image generating unit may further include a confidence map generating unit for generating a confidence map by evaluating confidence of each of the plurality of pixels of the panorama image according to a preset manner.

The information on the terminal call signal may be generated by the mapping server by a request of the display controlling computer and, then, is transmitted to the display controlling computer, or is generated by the display controlling computer itself and, then, is transmitted to the mapping server.

The color information may include color sequence information having a plurality of colors changed with the passage of time. The plurality of colors may include any one or more selected from a chromatic color and an achromatic color. In some exemplary embodiments, the color sequence information may include color sequence information having a chromatic color and an achromatic color alternated with the passage of time. In addition, in the color sequence information, the preceding color and the following color adjacent to each other may have different contrast ratios. Further, the color sequence information may be repeated at a predetermined time interval.

The terminal call signal may include a plurality and different terminal call signals and the call signals are displayed on call areas spaced apart from each other on the display area, respectively. In this case, the terminal call signals may further include position information corresponding to the call areas.

In some exemplary embodiments, the response signals may include identifier information of the portable terminal device. The identifier information may be configured of any one of an Internet protocol (IP) address, media access control (MAC) address, modem serial number, serial number of a network device, serial number of a system board, and user personally identifiable information, phone number, unique device identification (UDID), hardware model name or a combination thereof.

The display unit may include a touch screen interface. Further, in the case that a touch event is occurred on the touch screen interface by a touching of the portable terminal device, a finger of a user, or a tool, a call area in which the color information is displayed is defined in an area in which the touch event is occurred in the display area.

The mapping server may issue a unique identification information for the connection event representing that the display controlling computer and the portable terminal device have been linked to each other, and the mapping server itself, another server or cloud system present on the network perform information process work including one or more of sharing and transferring of data and a trade based on the unique identification information.

The mapping server may include, in itself or remotely, a service providing unit providing a service for transmission and reception of a message, an electronic payment, exchange and sharing of multimedia content information, a game, a drinking, an education, a lecture, or a meeting.

According to another exemplary embodiment of the present invention, there is provided a mapping method including: storing, in a mapping server, information on terminal call signal displayed on a portion or the entirety of a display area of a display unit controlled by a display controlling computer identified on a network, the information on terminal call signal including color information; receiving, by the mapping server, response signal of a portable terminal device generated by the portable terminal device recognizing the terminal call signal displayed on the display area by the display controlling computer through a photo-sensor installed on the portable terminal device; and mapping, in the mapping server, between the terminal call signal and the response signal, thereby linking between the display controlling computer and the portable terminal device on the network so that any one or both of exchange and sharing of data between the display controlling computer and the portable terminal device are performed.

The display controlling computer may be identified on the network by executing a computer application in the display controlling computer to log in the mapping server. The response signals may include identifier information of the portable terminal device, and the identifier information may be transmitted to the mapping server, such that the portable terminal device is identified on the network. Identifier information of the portable terminal device may be transmitted to the mapping server by executing a terminal application in the portable terminal device to log in the mapping server.

In some exemplary embodiments, the mapping method may further comprise issuing unique identification information for the connection event representing that the display controlling computer and the portable terminal device have been linked to each other by the mapping server. The mapping server itself, another server or cloud system present on the network may perform information process work including one or more of sharing and transferring of data and a trade based on the unique identification information.

According to still another exemplary embodiment of the present invention, there is provided a mapping method including: displaying a terminal call signal displayed on a portion or the entirety of a display area of a display unit controlled by a display controlling computer identified on a network, the information on terminal call signal including color information and being stored in a mapping server; recognizing the terminal call signal by a photo-sensor installed on the portable terminal device to generate a response signal of the portable terminal device generated; and performing any one or both of exchange and sharing of data between the display controlling computer and the portable terminal device by mapping, in the mapping server, between the terminal call signal and the response signal, thereby linking between the display controlling computer and the portable terminal device on the network.

In some exemplary embodiments, the recognizing of the terminal call signal may be performed by contacting the photo-sensor of the portable terminal device with the portion or the entirety of the display area of the display unit.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
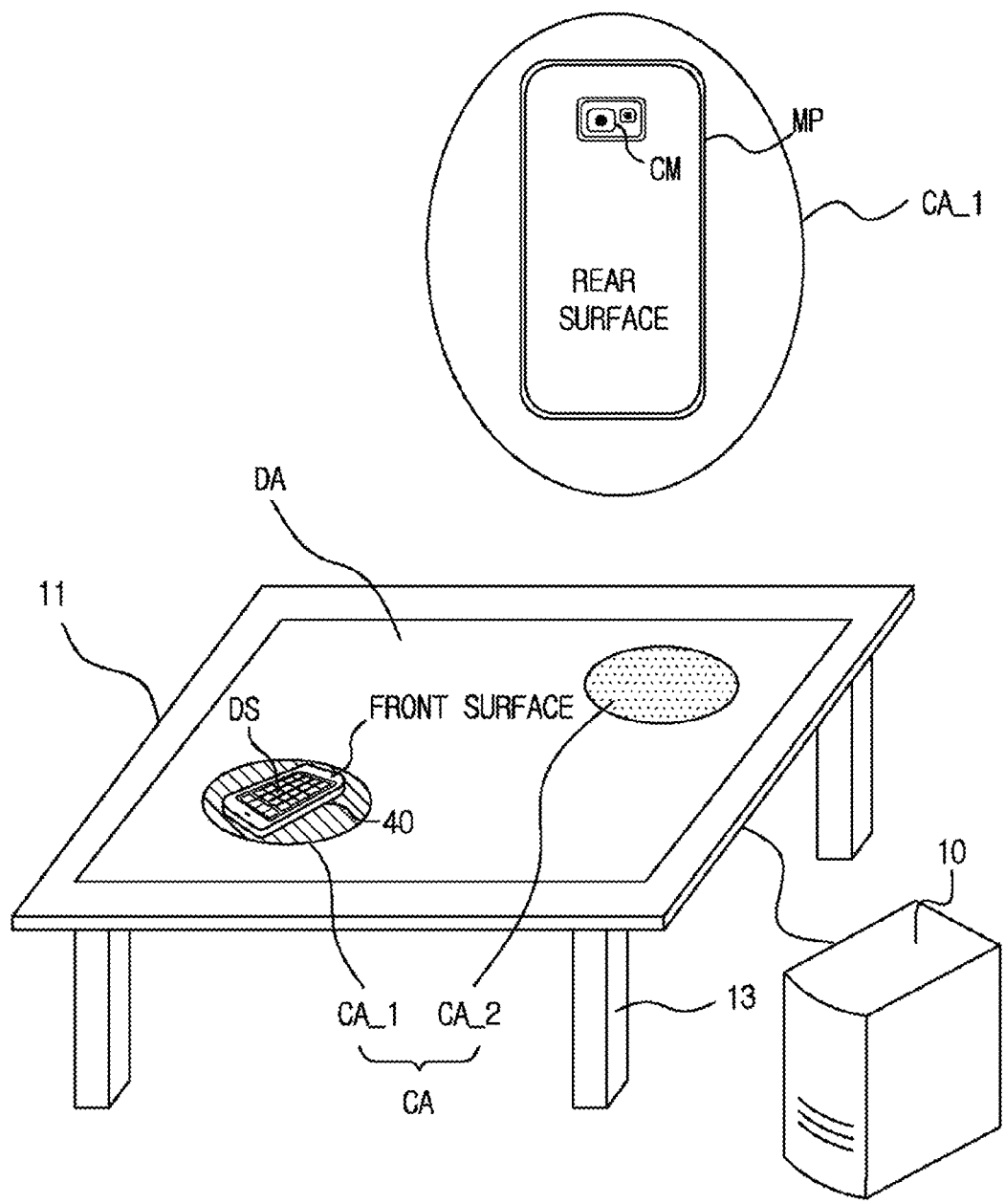
FIG. 1 is a perspective view showing a display controlling computer and a portable terminal device that are linked to each other on a network according to an exemplary embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "portion", a "module", a "block" or like, when used in the specification, represents a unit that processes at least one function or operation, and the unit or the like may be implemented by hardware or software or a combination of hardware and software.

In the present specification, although terms such as first, second, etc., are used to describe various members, components, areas, layers and/or portions thereof, these members, components, areas, layers and/or portions thereof are not limited to these terms. These terms are used only to distinguish one member, component, area, layer or a portion thereof from another member, component, area, layer or a portion thereof. Accordingly, a first member, a first component, a first area, a first layer, or a portion thereof to be described below may indicate a second member, a second component, a second area, a second layer, or a portion thereof without the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

FIG. 1 is a perspective view showing a display controlling computer 10 and a portable terminal device 40 that are linked to each other on a network according to an exemplary embodiment of the present invention.

Referring to FIG. 1, the display controlling computer 10 may display information through a display unit 11, which functions as an output device, and control the display unit 11 to process information by recognizing a touch event from the display unit 11, as described below. The display controlling computer 10 may be, for example, a desktop computer, a multiprocessor system, a microprocessor based or programmable electronic device, a network personal computer, a mini computer, or a main frame computer. However, these are only exemplary and the present invention is not limited thereto. The display controlling computer 10 may be any appropriate computing device including an appropriate central processing unit (CPU) or microprocessor that may process a command requested through a network and a storage device such as a memory, a hard disk, a solid state drive (SSD), a compact disk-read only memory (CD-ROM), and a hologram for temporally or permanently storing the processed data.

The display controlling computer 10 may be a single system present at a fixed position separately from the display unit 11 as shown in FIG. 1 or an embedded computer miniaturized and coupled to the display unit 11. Alternatively, the display controlling computer 10 is not limited to a configuration in which resources for implementing the display controlling computer 10 are present in a single computer system, but may also be a decentralized system in which the resources are distributed across remote places, such as a cloud system.

The display unit 11 may be light emitting display, or preferably, non-reflective display. The display unit 11 may be, for example, a passive-emissive display such as a liquid crystal display, or a self-emissive display such as organic or inorganic light emitting diode, cathode ray tube, plasma display panel, and vacuum fluorescent display. These display devices described above are illustrative and the present invention is not limited thereto. The display unit 11 may be other self-emissive display or passive-emissive display. As disclosed later in detail, visual information on the display unit 11 may be recognized by contacting a photo-sensor CM of a portable terminal device 40 with a surface of the display unit 11. In this case, it is desirable that the display unit 11 is non-reflective light emitting display since the recognizing of the visual information is needed in the condition of insufficient or no external light.

The display unit 11 may have a typical form of desktop computer's monitor. However, not limited to that, the display unit 11 may be implemented to be a visual information display device having various forms, such as a table, an electronic board, a signboard, an electronic book, a tablet PC, a smart TV, and a kiosk by virtue of the technical trends of thinness, largeness, and flexibility of a display device. Preferably, as shown in FIG. 1, the display unit 11 may also have a table form so that users may perform an action such as a meeting, a work, a reading, an eating, a drinking, an education, a presentation, a lecture, or a game in a state in which they sit down or stand up. To this end, the display unit 11 may include a table support 13 such as a leg for supporting the display unit 11. Advantages of the display unit 11 having the table form described above will become more obvious through exemplary embodiments to be described below.

The display unit 11 may have a display area DA disposed at an upper surface of the table and include a touch screen interface for recognizing the touch event thereon. The touch screen interface may include a multi-touch interface through which multiple touch inputs may be performed. The touch screen interface may be a capacitive or resistive touch screen interface as well-known in the art.

In another exemplary embodiment, the touch screen interface may be a photo-sensor type touch screen interface. The touch screen interface may have photo-sensors which are arranged in an array form on a plane of the display area DA. For example, in the case in which the touch event is generated by putting an object on a predetermined area of the display area DA, a contact of a human body, and an action using a stylus pen, the photo-sensor recognizes a touch by a decrease in an incident light amount and a position of the photo-sensor recognizing the touch defines a coordinate of the touch event made on the display area DA.

In still another exemplary embodiment, the touch screen interface may also be an interface in which light emitting devices emitting light across the display area DA are disposed in an array form at one side of an edge portion of the display unit 11 and light receiving devices are disposed in an array form at the other side of the edge portion facing one side thereof at which the light emitting devices are disposed to define a position of the touch event by sensing a decrease in a light amount according to the touch event. The touch screen interfaces described above are only an example and may also have other known appropriate configurations.

The display controlling computer 10 defines at least one call area CA at a portion of the display area DA and displays a terminal call signal in the call area CA. In the case in which the number of call areas CA is plural, the plurality of call areas CA may be disposed to be spaced apart from each other so as not to be overlapped with each other and the terminal call signals allocated to each of the call areas CA may be different from each other. A shape and a size of the call area CA may be various, and the present invention is not limited to the shape and the size of the call area CA. For example, as shown in FIG. 1, the call area CA may be larger than the portable terminal device 40 and have a circular shape. However, this is illustrative, and the call area CA may also have other polygonal shapes such as an oval shape, a rectangular shape, and a pentagonal shape.

In an exemplary embodiment, a position of the call area CA may be preset. For example, the call area CA may be set to be adjacent to a place at which a user is positioned in consideration of a table form of the display unit 11. For example, in the case in which the display unit 11 has a form of a rectangular table for four people, each of the call areas CA may be disposed at any one or plurality of the areas of the display area DA quadrisected into an upper end, a lower end, a left end, and a right end. FIG. 1 illustrates that the call areas CA_1 and CA_2 are disposed at the left lower end and the right upper end.

In another exemplary embodiment, in the case in which the display unit 11 includes the touch screen interface, the call area may not be preset. That is, when the portable terminal device 40 is put on any place of the display area DA or a touch event is generated by a contact of an object such as a finger or a stylus pen, a position of the touch event generated on the display area DA may be sensed and a corresponding call area may be generated at an area at which the touch event is generated.

The call area CA may display a terminal call signal including color information. The terminal call signal displayed in the call area CA may be displayed in a scheme in which it fills the entirety of the corresponding call area. The color information may be configured of a single color or include color sequence information having a plurality of colors changed with the passage of time. The color information may include any one or both of a chromatic color such as a red color, a green color, and a blue color and an achromatic color such as a white color, a gray color, and a black color. Preferably, the color sequence information may include color sequence information having the chromatic color and the achromatic color alternated partially or entirely with the passage of time. Further, in the color sequence information, the preceding color and the following color adjacent to each other may have different contrast ratios. The contrast ratio may be in the range of 1.5 to 107.

The first color sequence information may have color information displayed in a sequence of a red color, a green color, and a blue color and the second color sequence information may have color information displayed in a sequence of a yellow color, a red color, and a blue color. In another exemplary embodiment, the chromatic color and the achromatic color are combined with each other, such that the first color sequence information may have color information displayed in a sequence of a red color, a white color, a green color, a white color, and a blue color and the second color sequence information may have color information displayed in a sequence of a yellow color, a black color, a red color, a white color, and a blue color. The sequence and the kind of colors in the first color sequence information and the second color sequence information described above are illustrative and the present invention is not limited thereto. Further, in the case in which the color sequence information described above is repeated, the chromatic color and the achromatic color are displayed for a predetermined reproduction time in an interval between the repeated color sequence information, thereby making it possible to recognize that the color sequence information is repeated.

The color sequence information changed with the passage of time may be viewed to the user as if the call area flickers in the display area DA or a color of the call area is continuously changed. The entire reproduction length of the color sequence information described above and reproduction lengths of individual colors in the color sequence information may be appropriately determined according to a camera CM and a processing speed of a portable terminal device 40 to be described below. For example, the entire reproduction length of the color sequence information may be in the range of 4 to 10 seconds, and the reproduction lengths of the individual colors may be in the range of 0.1 to 2 seconds. The display of the color sequence information may be repeated before an ending control of a computer.

In the case in which the chromatic color and the achromatic color are alternately with the passage of time and/or the preceding color and the following color have different contrast ratios, as described below, when the camera CM of the portable terminal device 40 should recognize the color sequence information in a close-up scheme by contacting the display area DA and the camera CM, adjacent colors have a large difference in view of hue (saturation) and/or brightness in a color space, thereby making it possible to improve a recognition possibility of the color sequence information through the camera or photo-sensor CM. In the case in which the terminal call signal is displayed as the color sequence information, each of the colors may be displayed at a predetermined time interval, and the same color sequence information may be repeated at the time of completion of one color sequence information.

As illustratively shown in FIG. 1, in the case in which two call areas CA, that is, a first call area CA_1 and a second call area CA_2 are preset on the display area DA by the display controlling computer 10, the first call area CA_1 may display the first color sequence information and the second call area CA_2 may display the second color sequence information. In the case in which the first call area CA_1 and the second call area CA_2 are preset, the first color sequence information and the second color sequence information are displayed in the display area DA, such that the user may intuitively recognize where of any one of the first call area CA_1 and the second call area CA_2 he/she can put his/her portable terminal device 40.

As described above, in another exemplary embodiment, when the portable terminal device 40 is put on any area in the display area DA, for example, the left lower end, the touch screen interface of the display unit 11 recognizes the touch event of the portable terminal device 40, defines the first call area CA_1 at a place on which the portable terminal device 40 is put, and activates the first call area CA_1, such that the first color sequence information may be displayed in the first call area CA_1. Likewise, when another portable terminal device 40 is put on the second call area CA_2, the second call area CA_2 is activated, such that the second color sequence information may be displayed in the second call area CA_2.

The portable terminal device 40 may recognize the terminal call signal displayed in the call areas CA_1 and CA_2 of the display area DA through a photo-sensor CM. The portable terminal device 40 may be a small mobile communication device that may be easily carried by a user, for example, a mobile computing device such as a cellular phone, a net-book, a table PC, an e-book terminal, or a notebook. Preferable, the portable terminal device 40 may be a device including a display unit DS disposed at a front surface thereof and a photo-sensor CM disposed at a rear surface thereof. Typically, the portable terminal device 40 may be a smart phone or a smart pad. The reason is that the user may visually confirm that a terminal software application for a link is driven through the display unit DS of the portable terminal device 40 and the user can be guided through the display unit DS in connection with the process for the linking. As described below, when the terminal application for a link may be driven, the display controlling computer 10 and the portable terminal device 40 may be linked to each other regardless of an operation system or a manufacturer of the portable terminal device 40.

The photo-sensor CM or the camera of the portable terminal device 40 may include a lens, an iris, and a photo-sensing semiconductor device as an image-pickup device such as a charge coupled device (CCD) or a CMOS image sensor (CIS). In addition, the portable terminal device 40 may further include an analog to digital converter (ADC) converting an optical analog signal sensed through the camera CM into a digital signal, a memory storing the converted image file therein, and various physical and electronic filters improving imaging sensitivity and/or color recognition.

Generally, in the case in which the camera CM is disposed at the rear surface of the portable terminal device 40, in order to recognize the terminal call signal displayed in the call area CA, the user may allow the rear surface of the portable terminal device 40 at which the camera CM is disposed to be directed toward the display area DA, preferably, allow the rear surface of the portable terminal device 40 to be contacted with the display area DA to close up the terminal call signal displayed in the call area CA through the camera CM. To the contrary, in the case in which the camera CM is positioned at the front surface of the portable terminal device 40, the user may allow the front surface of the portable terminal device 40 to be directed toward the display area DA and may also allow the front surface of the portable terminal device 40 to contact the display area DA.

As described above, when the portable terminal device 40 is put on the display unit 11 having the table form, the user may become hands-free and the user's gesture such as a drag and drop between the call area and another area of the display unit 11 having the table form can make an action such as exchanging and/or sharing of a message, information, and/or a multimedia content, a trade, an education, a lecture, an eating, a drinking, a game, or the like, be more easily conducted between the display controlling computer 10 and the portable terminal device 40, as described below.

As described above, the terminal call signal is generated in the call area CA of the display area DA and is recognized by the portable terminal device 40 positioned at the call area CA through the camera CM of the portable terminal device 40. Then, the portable terminal device generates a response signal corresponding to the terminal call signal, and a mapping server present on a network relays between the display controlling computer 10 and the portable terminal device 40 through the response signal, such that the display controlling computer 10 and the portable terminal device 40 may be linked to each other.

Figure 2:
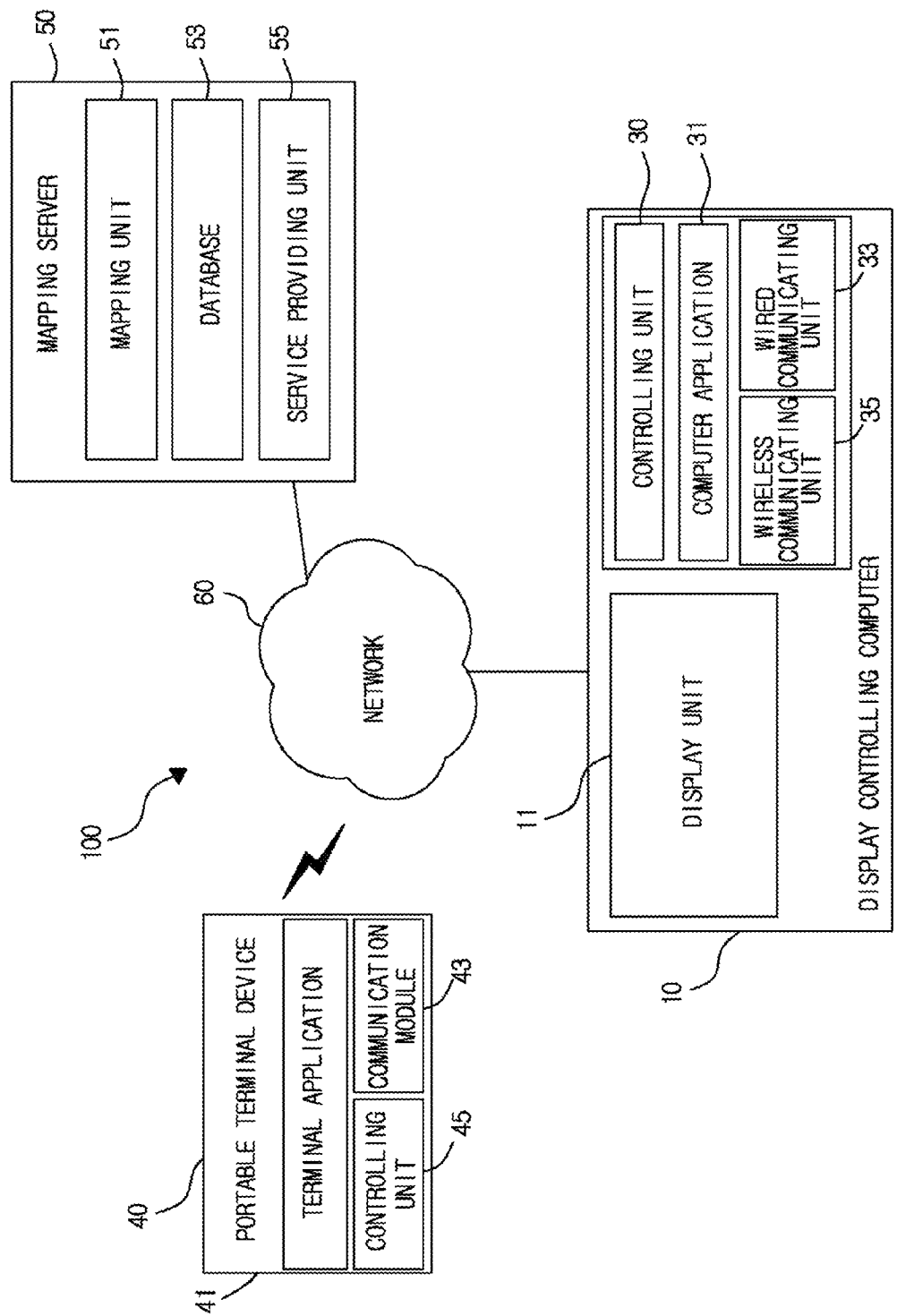
FIG. 2 is a schematic configuration diagram of a mapping system including the display controlling computer and the portable terminal device shown in FIG. 1.
Figure 3:
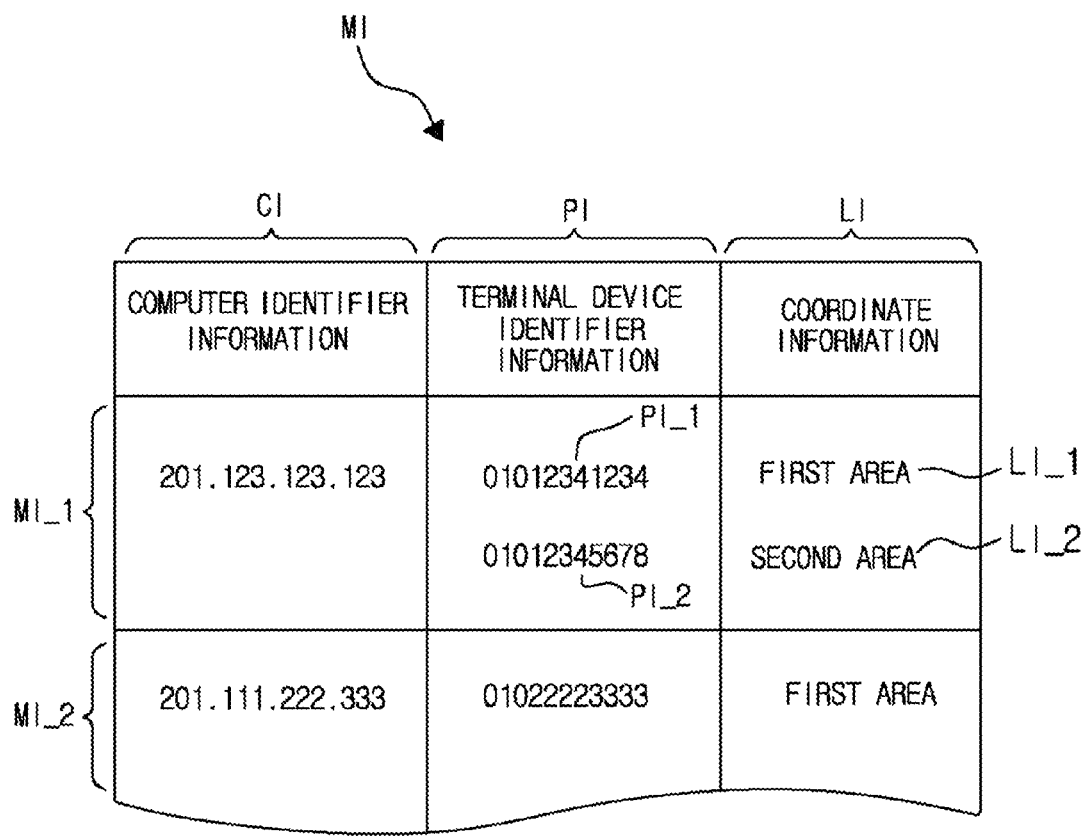
FIG. 3 is a conceptual diagram for describing mapping information generated by the mapping server shown in FIG. 2.

FIG. 2 is a schematic configuration diagram of a mapping system including the display controlling computer 10 and the portable terminal device 40 shown in FIG. 1; and FIG. 3 is a conceptual diagram for describing mapping information generated by the mapping server shown in FIG. 2. With respect to components having the same reference numerals as those of the components described above, unless being contradicted, the above-mentioned description will be referred to and an overlapped description will be omitted.

Referring to FIG. 2, the mapping system 100 may include the display controlling computer 10, the portable terminal device 40, and a mapping server 50. FIG. 2 illustrates that the portable terminal device 40 and a network 60 are connected to each other in a wireless network and the display controlling computer 10 and the mapping server 50 are connected to each other in a wired network. However, this is illustrative. That is, the network 60 may be a mixture of a local area wired and wireless communication network, a wide area wired and wireless communication network, an Internet network, and a mobile communication network and also include relay devices such as a hub, a gateway, and a router as well-known in the art.

Through the network 60, the display controlling computer 10 may request information on a terminal call signal to be used by itself to the mapping server 50, receive the information on the terminal call signal from the mapping server 50, and then, control the display unit 11 to display the terminal call signal on the display unit 11.

As described above, the terminal call signal is a signal which includes color information displayed through the display unit 11 and is recognized by the portable terminal device 40 through the camera of the portable terminal device 40. The portable terminal device 40 which has recognized the terminal call signal, then, may generate a response signal corresponding to the terminal call signal and transmit the response signal to the mapping server 50. Then, the mapping server 50 receives the transmitted response signal and maps between the information on the terminal call signal of the display controlling computer 10 and information on the response signal of the portable terminal device 40 to complete a link between the display controlling computer 10 and the portable terminal device 40 on the network.

As another exemplary embodiment, the terminal call signal may be generated by the display controlling computer 10 itself. To this end, the display controlling computer 10 may have a library for configuring its own terminal call signal, for example, the color sequence information in itself or request the library to the mapping server 50, and generate the terminal call signal through the library to display the generated terminal call signal on the display unit 11. In this case, the display controlling computer 10 may transmit the information on the terminal call signal generated by itself to the mapping server 50.

The display controlling computer 10 may transmit computer identifier information to the mapping server 50 while requesting the terminal call signal to the mapping server 50. Alternatively, the display controlling computer 10 may also generate the terminal call signal by itself and transmit the information on the terminal call signal together with the computer identifier information to the mapping server 50.

The computer identifier information may be unique information for identifying the display controlling computer 10 among a plurality of computers on the network. The identifier information of the display controlling computer 10 may be configured of any one of an Internet protocol (IP) address, a media access control (MAC) address, a modem serial number, a serial number of a network device, a serial number of a system board, and user personally identifiable information, or a combination thereof.

When the identifier information of the display controlling computer 10 is transmitted to the mapping server 50 as described above, the mapping server 50 stores and manages one or more information on terminal call signals to be used in a corresponding display controlling computer and the computer identifier information. The storing of the information on the terminal call signals and the computer identifier information may be performed in a database of the mapping server 50.

The display controlling computer 10 may include a controlling unit 30, for example a central processing unit or a microprocessor, capable of controlling the display unit 11, in addition to the display unit 11, wherein the controlling unit 30 may execute a computer application 31 for a linkage with the portable terminal device 40. In addition, the display controlling computer 10 may include a wired communicating unit 33 and a wireless communicating unit 35 for performing communication on the network.

The computer application 31 is a program stored and executed by the display controlling computer 10 so as to control the illustrated components incorporated in the display controlling computer 10 directly or through an operation system, transmit and receive the information on the terminal call signal and mapping information to and from the mapping server 50, perform work associated with various services provided from the mapping server 50, and perform work associated with a trade and a game to exchange and/or share a message, information, and/or a multimedia content, trade and game. In some exemplary embodiments, the computer application 31 may include a log-in interface, and a log-in step is activated when the computer application 31 is executed by a user, so that the identifier information of the display controlling computer 10 may be transmitted to the mapping server 50 in advance.

The computer application 31 may also provide an appropriate user interface (UI) according to a user of the display controlling computer 10 and/or a content of the above work. For example, in the case in which the display controlling computer 10 having the table form is disposed at a restaurant, the computer application 31 may provide a food menu provided by the corresponding restaurant. Further, the computer application 31 may also be connected to the mapping server 50 and linked to a pay gate to provide a payment service.

The wired communicating unit 33 may be connected to a network such as the internet network through a wired local area network (LAN) connection and perform communication with the mapping server 50 through the external network to which it is connected. The wireless communicating unit 35 may be connected to a local area communication network through a wireless connection such as Wi-Fi and Bluetooth to perform communication with the mapping server 50.

As described above, the display controlling computer 10 may include a touch screen interface for recognizing the touch event occurred on the display area DA. Further, although not shown, the display controlling computer 10 may further include other input/output interface units (not shown) such as a keyboard, a mouse, and a printer for inputting a command of the user.

The portable terminal device 40 may include a terminal application 41, a communication module 43, and a controlling unit 45 controlling the terminal application 41 and the communication module 43. The communication module 43 may perform a communication connection with the mapping server 50 and the display controlling computer 10 and include various types of wired and/or wireless network connection modules such as 3G, Bluetooth, and Wi-Fi. The controlling unit 45 may be a central processing unit or a microprocessor.

The terminal application 41 is a program storing and executed in the portable terminal device in order to recognize the information on the terminal call signal, generate the response signal, and transmit and receive the mapping information to and from the mapping server 50 to perform a link with the display controlling computer 10. The terminal application 41 may control the components, for example, the communication module 43 and a photo-sensor module 45 incorporated in the portable terminal device 40 directly or through an operation system, transmit and receive the information on the terminal call signal and mapping information to and from the mapping server 50, perform work associated with various services provided from the mapping server 50, to perform work associated with exchanging and/or sharing a message, information, and/or a multimedia content, a trade and a game with the display controlling computer 10. The user may download and install the terminal application 41 through an application store or by accessing the mapping server 50.

The terminal application 41 may interpret color information of an image picked up from the call area CA of the display area DA in order to recognize the terminal call signal. For example, the color information of the image may be a RGB code or color space. Generally, in the RGB color space, a yellow color may be interpreted as a color coordinate (R, G, B)=(255, 255, 0), a blue color may be interpreted as a color coordinate (R, G, B)=(0, 0, 255), and a white color may be interpreted as a color coordinate (R, G, B)=(255, 255, 255). An illustrated numeral "0, 255" means a grayscale. In the yellow color, values of R and G are larger than that of B, and in the blue color, a value of B is larger than those of R and G. The terminal application 41 may read information of the picked-up image, that is, a RGB code. In case that the terminal call signal is displayed by the color sequence information with passage of time, the terminal application 41 also may recognize change timing of colors and/or a time length of the color sequence information.

The terminal application 41 may transmit the color information of the read image as the response signal for the terminal call signal to the mapping server 50. In another exemplary embodiment, the terminal application 41 may also transmit the identifier information of the display controlling computer 10 as the response signal for the terminal call signal to the mapping server 50. In one example, the identifier information of the display controlling computer 10 may be incorporated in the terminal call signal and, thereby, can be read from the terminal call signal by the terminal application 41. In some exemplary embodiments, the response signal may include information on a sequence of portable terminal devices to be recognized in the case that the display controlling computer 10 should recognize two or more portable terminal devices, as well as the identifier information of the display controlling computer 10.

Further, the response signal for the terminal call signal may include the identifier information of the portable terminal device 40 and the terminal application 41 may transmit the identifier information of the portable terminal device 40 to the mapping server 50. The identifier information of the portable terminal device 40 may be unique information of the portable terminal device 40 allocated in order to distinguish the portable terminal device from other of a plurality of terminal devices connected on the network. The identifier information of the portable terminal device 40 may be configured of any one of an internet protocol (IP) address, a media access control (MAC) address, a modem serial number, a serial number of a network device, a serial number of a system board, and user personally identifiable information, a phone number, and a unique device identification (UDID), hardware model name or a combination thereof, but is not limited thereto. In some exemplary embodiments, the terminal application 41 may include a log-in interface, and a log-in step is activated when the terminal application 41 is executed by a user, so that the identifier information of the portable terminal device 40 may be transmitted to the mapping server 50 in advance.

The mapping server 50 receiving the response signal links between the display controlling computer 10 and the portable terminal device 40 on the network by using and mapping the identifier information of the display controlling computer 10 and the identifier information of the portable terminal device 40. The response signal may include some or all of information of the terminal call signal. Alternatively, the response signal may further include the identifier information of the portable terminal device.

In some exemplary embodiments, the mapping may be performed by comparing the information of the terminal call signal of the display controlling computer 10 and the response signal of the portable terminal device 40 generated by recognizing the information of the terminal call signal with each other, and judging whether the information of the terminal call signal and the response signal coincide with each other. Thus, the mapping server 50 maps between the information of the terminal call signal of the display controlling computer 10 and the information of the response signal of the portable terminal device 40, thereby making it possible to accomplish a link between the display controlling computer 10 and the portable terminal device 40.

When the mapping is accomplished as described above, the mapping server 50 may issue a unique identification information for the connection event representing that the display controlling computer 10 and the portable terminal device 40 have been linked to each other, and the mapping server itself or another server or cloud system present on the network may perform information process work such as sharing and transferring of data and a trade based on the unique identification information. In another exemplary embodiment, in the case in which internet protocols (IPs) are exchanged between the display controlling computer 10 and the portable terminal device 40 by the mapping server 50, one to one communication may also be performed between the display controlling computer 10 and the portable terminal device 40 in a scheme such as a socket connection scheme. This link scheme is illustrative, and a link between the display controlling computer 10 and the portable terminal device 40 and a service based on the link may also be expanded to a multi-tier design such as two tiers or three tiers or more.

In the case that a plurality of portable terminal devices should be linked to a single display controlling computer 10, the display controlling computer 10 may generate a plurality of call areas CA each corresponding to the plurality of portable terminal devices and request the mapping server 50 for a plurality of different terminal call signals to be displayed on the corresponding call areas CA. The mapping server 50 may generate different terminal call signals, for example, different color information and/or color sequence information and provide the generated different terminal call signals to the display controlling computer 10. In another exemplary embodiment, as described above, the display controlling computer 10 may generate by itself a plurality of terminal call signals to be displayed in the plurality of call areas CA using its library and transmit the information on the generated terminal call signals and, optionally, identifier information of a computer to the mapping server 50. For example, a first color sequence may have a sequence of 'a red color, a green color, and a blue color', a second color sequence may have a sequence of 'a yellow color, a red color, and a blue color', and the mapping server 50 configures mapping information in one-to-multiple scheme using one computer identifier information and the plurality of identifier information of the respective portable terminal devices.

As described above, the mapping server 50 may map between the display controlling computer 10 and the portable terminal device 40 in a local area to link them on the network. The configured mapping information may be stored/managed in the database 53 of the mapping server 50 and an operation for mapping may be performed in a mapping unit 51.

The computer identifier information and the identifier information of the terminal device may be stored/managed in the database 53. The mapping server 50 may map between the display controlling computer 10 and the portable terminal device 40 in one-to-one scheme or in one-to-multiple scheme in the case that a single display controlling computer 10 is linked to a plurality of portable terminal devices and store the configured mapping information in the database 53.

The mapping unit 51 may be a combined unit of software and an information processing device such as hardware for mapping and linking between the display controlling computer 10 and the portable terminal device 40. The display controlling computer 10 and the portable terminal device 40 linked to each other may be connected to each other in a peer-to-peer (P2P) network scheme, a client-server scheme in a relationship with the mapping server 50, or a combination scheme thereof. In addition, as described above, the mapping unit 51 may map between the display controlling computer 10 and the portable terminal device 40 in one-to-one scheme or one-to-multiple scheme.

In some exemplary embodiments, the mapping server 50 may store/manage the computer identifier information of the display controlling computer 10, the identifier information of the portable terminal device 40, and position information of the call area of the display area DA, for example, coordinate information on the display area DA, in the database 53, and utilize these information to map between the display controlling computer 10 and the portable terminal device. The coordinate information may be a substantial coordinate on a two-dimensional plane or a kind of code to be recognized by the display controlling computer 10 and the mapping server 50. In some exemplary embodiments, the position information may also be transformed and incorporated into the terminal call signal and displayed in a form of additional color information on the corresponding call area, and may be recognized by the camera of the portable terminal device.

The mapping unit 51 may map between the computer identifier information of the display controlling computer 10, the identifier information of the portable terminal device, and optionally, the coordinate information and store the configured mapping information in the database 53. The mapping information may be basically stored/managed by the mapping server 50 and a portion of the mapping information may be selectively shared with the computing device configuring the network as needed.

For example, as shown in FIG. 3, the mapping information MI may include a plurality of mapping information MI_1 and MI_2 and, each of which may include computer identifier information CI, terminal device identifier information PI), and optically, coordinate information LI. The first mapping information MI_1 corresponds to the case in which two portable terminal devices are mapped to a single display controlling computer 10, and the second mapping information MI_2 corresponds to the case in which a single portable terminal device 40 is mapped to a single display controlling computer 10. The computer identifier information CI may illustrate an IP address allocated to the display controlling computer 10, the terminal device identifier information PI may illustrate a phone number, and the coordinate information LI may be configured of X-Y coordinates or names for each area. The first mapping information MI_1 is configured of an IP address (201.123.123.123) of the display controlling computer 10, identifier information PI-1 of a first terminal device disposed at a first area LI-1, and identifier information PI_2 of a second terminal device disposed at a second area LI_2. The database in which the mapping information MI is stored may include, for example, a hierarchical database, a network type database, a relational database, or an object oriented database, or a combination thereof, but the present invention is not limited thereto.

In some exemplary embodiments, the mapping server 50 may further include a service providing unit 55 providing data such as a message, information, a game, a multimedia content, and an advertisement to the display controlling computer 10 and the portable terminal device 40 and processing a service corresponding to a request such as transfer and sharing of the data between the display controlling computer 10 and the portable terminal device 40. The service providing unit 55 is not limited to the case in which the mapping server 50 by itself directly provides a service to the display controlling computer 10 and the portable terminal device 40, but may include the case that it provides a gate for a connection to other server or cloud system for providing this service. The service providing unit 55 may be a combined unit of software and an information processing device such as a microprocessor.

Each of the mapping unit 51, the database 53, and the service providing unit 55 of the mapping server 50 described above may be configured of one or more hardware for performing operations according to the exemplary embodiment of the present invention or software including commands for performing the operations. In addition, the mapping unit 51, the database 53, and the service providing unit 55 may be configured to be implemented by physically separate microprocessors and/or software or share a portion or overall of the microprocessor and/or the software with each other. In addition, the mapping server 50 may be a centralized system, a distributed system in which resources are distributed, or a cloud system.

As described above, as the link is set between the display controlling computer 10 and the portable terminal device 40 on the display area DA, an intuitive user interface may be formed between the display unit 11 and the portable terminal device 40. The user may operate the terminal application or transfer or share the data such as the information, the message, and the multimedia content stored in the portable terminal device to or with the display controlling computer 10 based on the operation of the terminal application. In this case, the shared data may be displayed on the display area DA. To the contrary, the user may operate the computer application or transfer or share the data stored in the display controlling computer to or with the portable display device based on the operation of the computer application. Further, in the case that the plurality of portable terminal devices is present on the display area DA, the data may also be transferred or shared between the portable terminal devices.

In some exemplary embodiments, in the case that the display unit 11 includes the touch screen interface, a more convenient and new user experience may be provided through the touch event. For example, in a restaurant, when a menu list is displayed on the display area DA, the user may select a food by pressing a corresponding food in the menu list. Then, when a user performs a drag or a click from an area in which the corresponding food or a calculated total amount of money is displayed to the call area in which his/her portable terminal device is present, it is considered such that a fee is calculated through the portable terminal device of the user, such that an electronic payment service for the corresponding user may start.

In connection with an electronic payment, various services such as a coupon may be combined with the electronic payment and then executed. As another example, the data may also be transferred or shared by activating target data to be shared on the display unit of the portable terminal device and performing a drag from the call area in which the portable device is present to another call area in which another device is present. The operations described above are illustrative, and various actions that may be performed on the table, such as exchange and sharing of data, for example, transmission and reception of a message, an electronic payment, content information, a game, an education, a lecture, a meeting, and the like, between the portable terminal device of which a position is recognized and the display controlling computer 10 and/or another portable terminal device may be electronically performed without intricately setting heterogeneous network.

As described above, according to the exemplary embodiment of the present invention, it is possible to provide the mapping server 50 and the mapping system 100 capable of implementing connection and data communication between the display controlling computer 10 and the portable terminal device 40 in a simpler and new schematic way by generating the terminal call signals in one or more areas of the display area DA, allowing the portable terminal device 40 positioned on the display area DA to recognize the terminal call signals, and mapping between the display controlling computer 10 controlling the display unit 11 and the portable terminal device 40 to link each other on the network.

In addition, it is possible to provide a new user experience by recognizing the position of the portable terminal device 40 on the display area DA and variously processing the information displayed on the display area DA through the touch input of the user and the information between the display controlling computer 10 and the portable terminal device 40.

Figure 4:
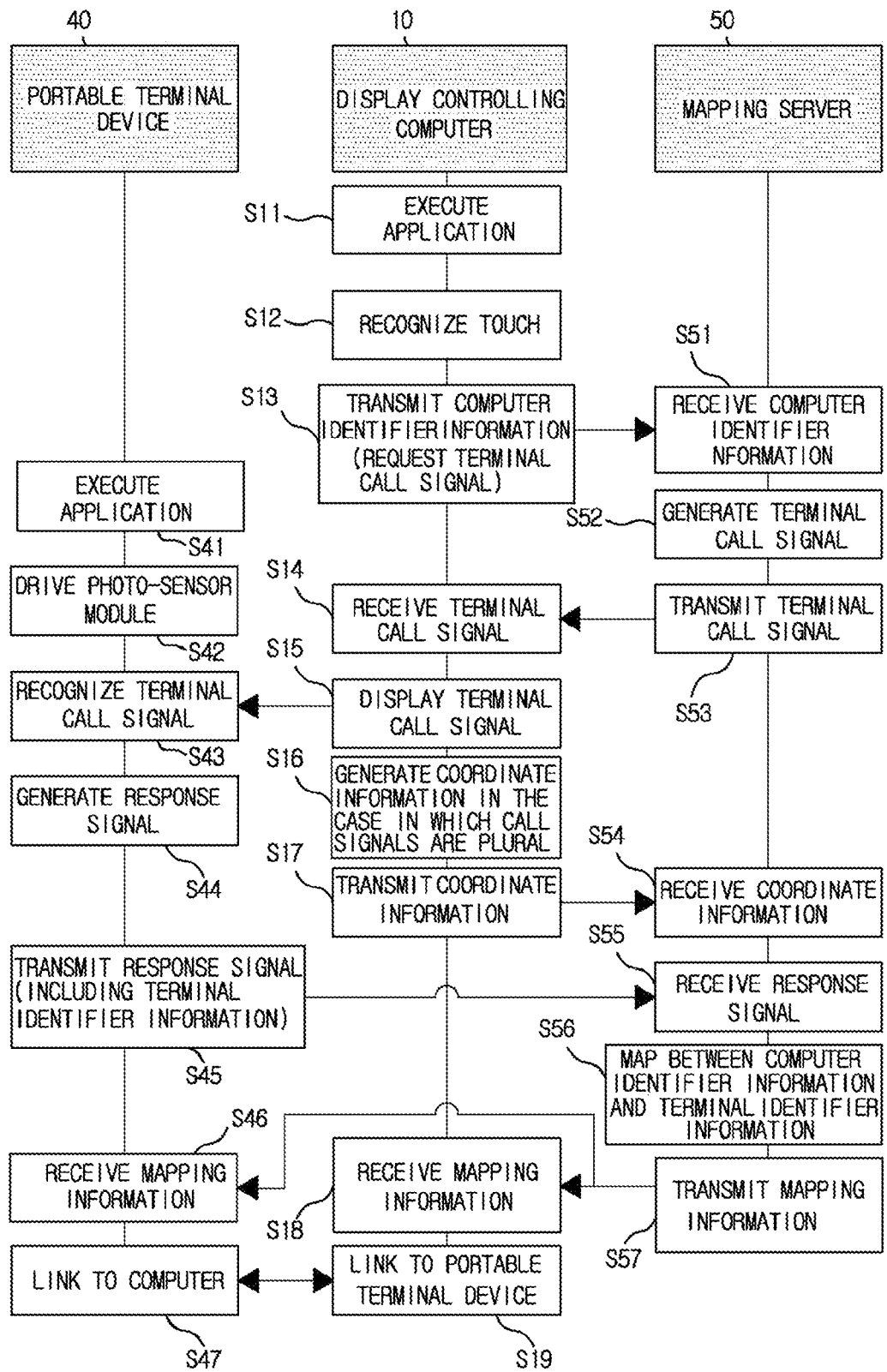
FIG. 4 is a flow chart showing a mapping method of a mapping system according to the exemplary embodiment of the present invention.

FIG. 4 is a flow chart showing a mapping method of a mapping system according to the exemplary embodiment of the present invention.

Referring to FIG. 4, the computer application 31 stored in the display controlling computer 10 is executed (S11). When the computer application 31 is executed, the display controlling computer 10 may start in a standby mode in which it monitors the touch input of the display unit 11 without a separate input. The terminal application 41 stored in the portable terminal device 40 carried by the user may also be executed (S41). When the terminal application 41 is executed, the portable terminal device 40 may start in a standby mode in which it drive the photo-sensor module 45 to sense the terminal call signal (S42).

When the user puts the portable terminal device 40 on the display area DA of the display controlling computer 10, the display controlling computer 10 recognizes the touch of the portable terminal device 40 (S12). Then, the display controlling computer 10 transmits the computer identifier information together with a request for the terminal call signal to the mapping server 50 (S13). The computer identifier information may include information for recognizing the display controlling computer 10 on the network, for example, an IP address. In another exemplary embodiment, when the computer application 31 is executed, the display controlling computer logs in the mapping server 50, such that log-in information and corresponding identifier information may also be transmitted.

The mapping server 50 connected to the display controlling computer 10 on the network 60 receives the computer identifier information together with the request for the terminal call signal (S51). The mapping server 50 generates the terminal call signal (S52). In another exemplary embodiment, the display controlling computer 10 may generate the terminal call signal by itself and transmit the terminal call signal together with the computer identifier information to the mapping server 50.

Thereafter, the mapping server 50 transmits the generated terminal call signal to the display controlling computer 10 having the IP address included in the computer identifier information (S53). The display controlling computer 10 may receive the terminal call signal from the mapping server 50 (S14). In the case in which the display controlling computer 10 generates the terminal call signal by itself, steps (S53 and S14) may be omitted.

The terminal call signal generated by the mapping server 50 or the display controlling computer 10 includes the color information displayed on the call area CA and recognized by the portable terminal device 40. The color information may be configured of a single color or include color sequence information having a plurality of colors changed with the passage of time.

The display controlling computer 10 forms a call area (CA) having a sufficient size in the display area DA on which the portable terminal device 40 is put and display the terminal call signal on the call area CA (S15). Colors may be displayed in a sequence of, for example, a red color, a green color, and a blue color according to a color sequence of the terminal call signal. A black color or a white color may also be displayed between the colors described above, such that the color sequence may be displayed as if it flickers.

The portable terminal device 40 recognizes the terminal call signal through its camera CM (S43). In order for the portable terminal device 40 to recognize the terminal call signal displayed on the call area CA, the user should allow a surface of the portable terminal device 40 at which the camera CM is disposed, for example, a rear surface to be directed toward the display area DA. As described above, the terminal application 41 may read and analyze the color information of the imaged image in order to recognize the terminal call signal. Then, the portable terminal device 40 generates the response signal corresponding to the terminal call signal (S44). The portable terminal device 40 transmits the response signal including the identifier information of the terminal device to the mapping server 50 (S45). The terminal application 41 may transmit the color information of the read image as the response signal meaning for recognition of the terminal call signal to the mapping server 50. The mapping server 50 receives the response signal from the portable terminal device 40 (S55). The mapping server 50 may read the identifier information of the portable terminal device 40 included in the response signal.

In some exemplary embodiments, in the case that the display controlling computer 10 needs to be linked to a plurality of portable terminal devices, it may request the mapping server 50 for a plurality of terminal call signals or generate the plurality of terminal call signals by itself and further generate coordinate information if needed (S16). The coordinate information may be a substantial coordinate on a two-dimensional plane of the display area DA or a kind of code to be recognized by the display controlling computer 10 and the mapping server 50. The display controlling computer 10 transmits the coordinate information of the call area CA in which the terminal call signal is displayed to the mapping server 50 (S17). The mapping server 50 may receive the coordinate information from the display controlling computer 10 (S54).

The mapping server 50 maps between the computer identifier information of the display controlling computer 10 and the identifier information of the portable terminal device 40 (S56). The mapping unit 51 may map between the computer identifier information, the identifier information of the portable terminal device, and, optionally, the coordinate information and store the configured mapping information in the database 53.

The mapping server 50 may transmit the mapping information to any one or both of the display controlling computer 10 and the portable terminal device 40 (S57). Any one or both of the display controlling computer 10 and/or the portable terminal device 40 receives the mapping information (S18 and S46). The portable terminal device 40 on the display area DA based on the mapping information is linked to mapping server (S19). Likewise, the display controlling computer 10 is linked to mapping server (S47). The portable terminal device 40 and the display controlling computer 10 may be connected to each other on a network through a mobile communication network and a local area communication network, respectively. As described above, when the portable terminal device 40 and the display controlling computer 10 are linked to each other, various services such as sharing and transfer of a message, a document, and a multimedia content, an electronic trade, a game, processing of information, may be performed between the portable terminal device 40 and the display controlling computer 10. To this end, the data may be transmitted in various forms such as a file, a packet, a stream, and the like.

Figure 5:
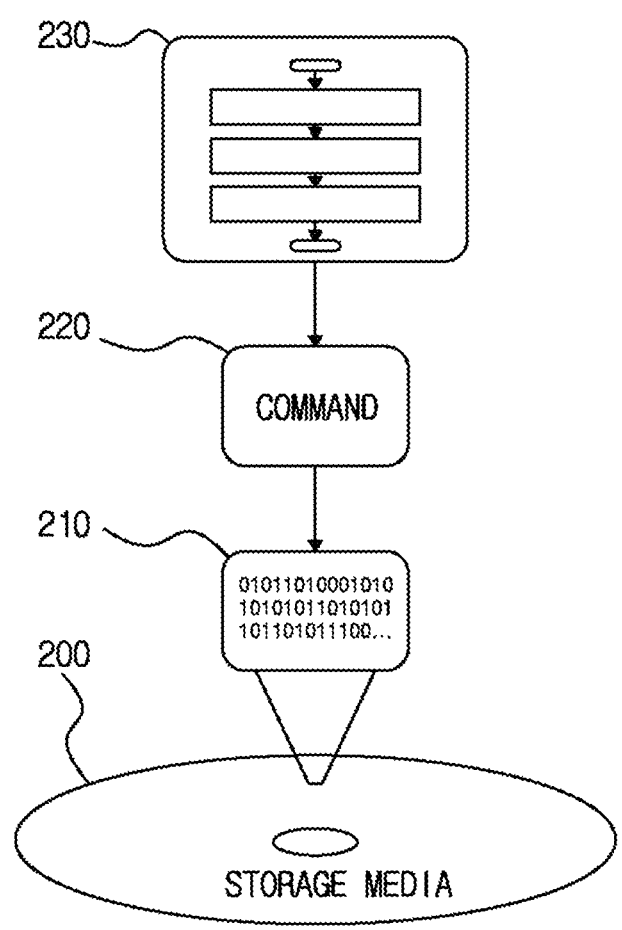
FIG. 5 is a diagram showing a storage media that may be read by a computer according to the exemplary embodiment of the present invention.

FIG. 5 is a diagram showing a storage media 200 that may be read by a computer according to the exemplary embodiment of the present invention. Referring to FIG. 5, the storage media 200 may include data 210 encoded from commands 220 for implementing the mapping method 230 and the mapping system disclosed herein. Examples of the commands may include machine language codes such as being made by compilers as well as high-level language codes capable of being executed by computers using interpreters, or the like.

The storage media 200 that may be read by the computer may be, for example, a non-volatile memory device such as a random access memory (RAM), a read only memory (ROM), an electrically erasable and programmable ROM (EEPROM), a flash memory, a compact disk ROM (CD ROM), a digital versatile disk ROM (DVD ROM), a hard disk, an optical or holograph media, a magnetic tape, a solid state disk device (SSD). However, this is only an example, and the present invention is not limited thereto.

The exemplary embodiments of the present invention described above may be executed in a form of the method, the system, or the storage media in order to produce software, firmware, hardware, a product, or a combination thereof such as a clouding computer environment using programming and/or engineering technologies, and the product may include all of the computer program, the carrier, and the media.

Although the exemplary embodiment described above has disclosed a link between one display controlling computer and one or plural portable terminal devices, this is only an example, and the present invention is not limited thereto. For example, it is possible to set a multiple-to-multiple link between a plurality display controlling computers and a plurality of portable terminal devices. For example, the mapping server may connect between the display controlling computers in advance and links the portable terminal devices to the display controlling computer, respectively, as described above, thereby making it possible to set the multiple-to-multiple link.

According to the exemplary embodiment of the present invention, the terminal call signals are generated in one or more area of the display area, the terminal device positioned on the display area receives the terminal call signals through the photo-sensor to generate the response signals, and the mapping server maps between the computer controlling the display device and the terminal device by receiving the response signals of the terminal device to link between the computer and the terminal device on the network, thereby making it possible to accomplish link and data communication between the computer and the portable terminal device.

In addition, the display area is combined with the touch screen interface, thereby making it possible to provide various user experiences and interfaces such as sharing and exchange of data through a gesture such as a drag or a touch between the portable terminal device and display controlling computer, and/or between the portable terminal devices.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A mapping server that is configured to:
   store information on terminal call signal displayed on at least one of call areas defined in a portion or an entirety of a display area of a display unit controlled by a display controlling computer identified on a network, the information on terminal call signal includes color sequence information having a plurality of colors changed with a passage of time;
   receive response signal from a portable terminal device recognizing the terminal call signal displayed on the display area by the display controlling computer through a photo-sensor installed on the portable terminal device, the response signal includes the color sequence information corresponding to the terminal call signal recognized through the photo-sensor by contacting the portable terminal device with the at least one of the call areas of the display area; and
   map between the information on the terminal call signal and the response signal, thereby linking between the display controlling computer and the portable terminal device on the network so that any one or both of exchanging and sharing of data between the display controlling computer and the portable terminal device are performed.

2. The mapping server of claim 1, wherein the information on the terminal call signal is generated by the mapping server by a request of the display controlling computer and, then, is transmitted to the display controlling computer, or is generated by the display controlling computer itself and, then, is transmitted to the mapping server.

3. The mapping server of claim 1, wherein the plurality of colors includes any one or more selected from a chromatic color and an achromatic color.

4. The mapping server of claim 1, wherein in the color sequence information, the preceding color and the following color adjacent to each other have different contrast ratios.

5. The mapping server of claim 1, wherein the color sequence information is repeated at a predetermined time interval.

6. The mapping server of claim 1, wherein the terminal call signal includes a plurality and different terminal call signals and the call signals are displayed on the call areas spaced apart from each other on the display area, respectively.

7. The mapping server of claim 6, wherein the terminal call signals further include position information corresponding to the call areas.

8. The mapping server of claim 1 wherein the response signals include identifier information of the portable terminal device.

9. The mapping server of claim 8, wherein the identifier information is configured of any one of an Internet protocol (IP) address, media access control (MAC) address, a modem serial number, serial number of a network device, serial number of a system board, and user personally identifiable information, phone number, unique device identification (UDID), hardware model name, or a combination thereof.

10. The mapping server of claim 1, wherein the display unit includes a touch screen interface.

11. The mapping server of claim 10, wherein when a touch event is occurred on the touch screen interface by a touching of the portable terminal device, a finger of a user, or a tool, the at least one of the call areas in which the color information is displayed is defined in an area in which the touch event is occurred in the display area.

12. The mapping server of claim 1, wherein the mapping server issues a unique identification information for the connection event representing that the display controlling computer and the portable terminal device have been linked to each other, and the mapping server itself, another server or cloud system present on the network perform information process work including one or more of sharing and transferring of data and a trade based on the unique identification information.

13. The mapping server of claim 1, wherein the mapping server includes, in itself or remotely, a service providing unit providing a service for transmission and reception of a message, an electronic payment, exchange and sharing of multimedia content information, a game, a drinking, an education, a lecture, or a meeting.

14. A mapping method comprising:
   storing, in a mapping server, information on terminal call signal displayed on at least one of call areas defined in a portion or an entirety of a display area of a display unit controlled by a display controlling computer identified on a network, the information on terminal call signal includes color sequence information having a plurality of colors changed with passage of time;
   receiving, by the mapping server, response signal from a portable terminal device recognizing the terminal call signal displayed on the display area by the display controlling computer through a photo-sensor installed on the portable terminal device, the response signal includes the color sequence information corresponding to the terminal call signal recognized through the photo-sensor by contacting the portable terminal device with the at least one of the call areas of the display area; and
   mapping, in the mapping server, between the information on the terminal call signal and the response signal, thereby linking between the display controlling computer and the portable terminal device on the network so that any one or both of exchanging and sharing of data between the display controlling computer and the portable terminal device are performed.

15. The mapping method of claim 14, wherein the display controlling computer is identified on the network by executing a computer application in the display controlling computer to log in the mapping server.

16. The mapping method of claim 14, wherein identifier information of the portable terminal device is transmitted to the mapping server by executing a terminal application in the portable terminal device to log in the mapping server.

17. The mapping method of claim 14, further comprising issuing a unique identification information for the connection event representing that the display controlling computer and the portable terminal device have been linked to each other by the mapping server, wherein the mapping server itself, another server or cloud system present on the network perform information process work including one or more of sharing and transferring of data and a trade based on the unique identification information.

18. A mapping method comprising:

displaying a terminal call signal displayed on at least one of call areas defined in a portion or an entirety of a display area of a display unit controlled by a display controlling computer identified on a network, information on terminal call signal includes color sequence information having a plurality of colors changed with a passage of time and is stored in a mapping server;

recognizing the terminal call signal by a photo-sensor installed on a portable terminal device to generate a response signal of the portable terminal device, the response signal includes the color sequence information corresponding to the terminal call signal recognized through the photo-sensor by contacting the portable terminal device with the at least one of the call areas of the display area; and performing any one or both of exchanging and sharing of data between the display controlling computer and the portable terminal device by mapping, in the mapping server, between the information on the terminal call signal and the response signal, thereby linking between the display controlling computer and the portable terminal device on the network.

19. The mapping method of claim 18, wherein the recognizing of the terminal call signal is performed by contacting the photo-sensor of the portable terminal device with the portion or the entirety of the display area of the display unit.

* * * * *